United States Patent Office 2,860,064
Patented Nov. 11, 1958

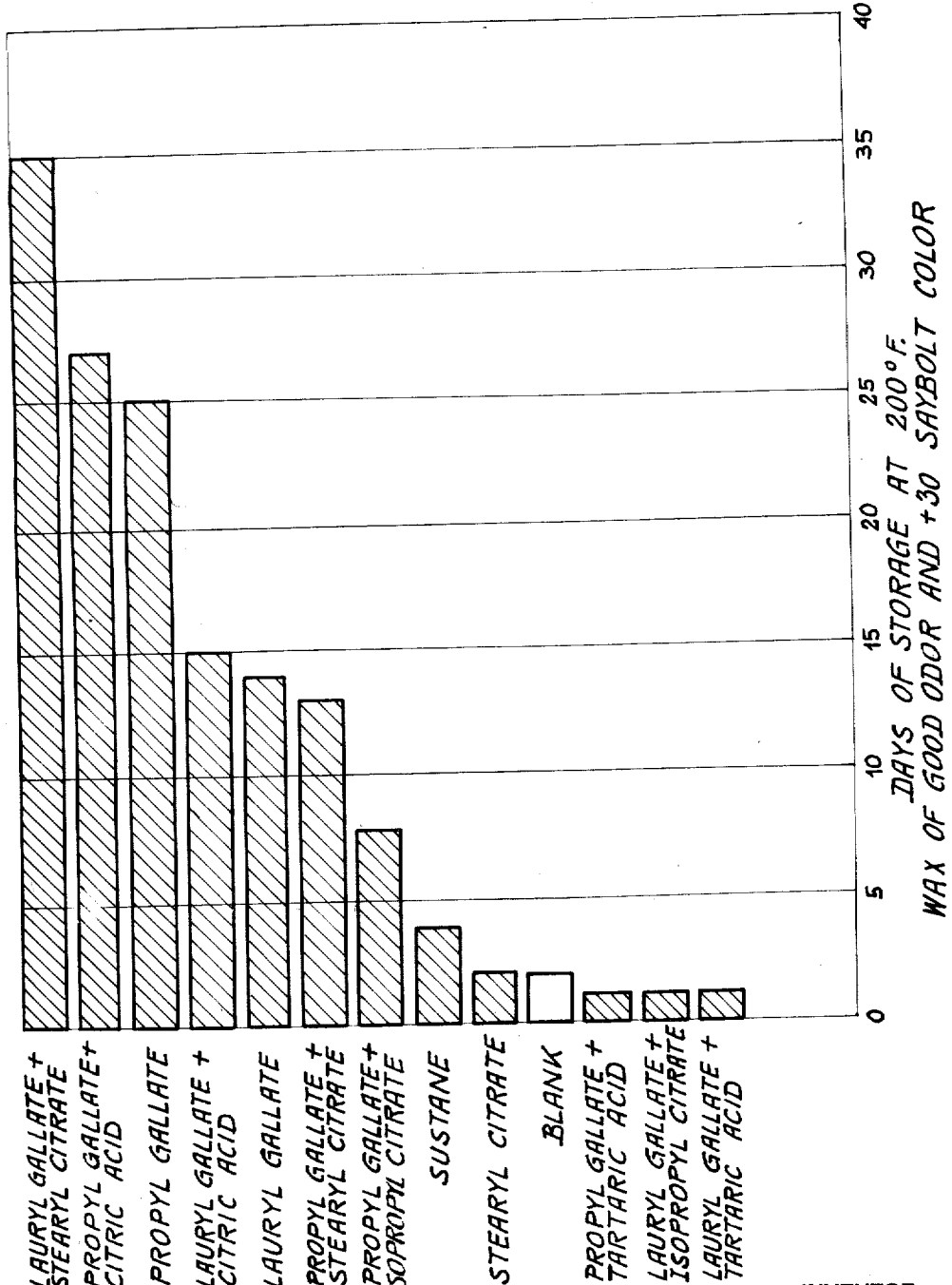

2,860,064

STABILIZED HYDROCARBON WAXES

Charles F. Duchacek, Long Island City, N. Y., assignor to Socony Mobil Oil Company, Inc., a corporation of New York Application January 26, 1955, Serial No. 484,154

4 Claims. (Cl. 106—268)

This invention has to do with the stabilization of petroleum waxes against the harmful effects of oxidation and deterioration with use. More particularly, the present invention is primarily directed to the stabilization of mineral oil fractions, and particularly petroleum wax fractions, by the use of a novel combination of compounds which together exert a synergistic stabilizing effect.

As is well known in the art, petroleum waxes—and particularly paraffin waxes—oxidize readily. Oxidation takes place at elevated temperatures; for example, oxidation occurs when the wax is kept in a molten condition in open tanks. Also, when paraffin waxes are dried by airblowing at temperatures of the order of 170° F. to 210° F., an offensive rancid odor generally develops. However, even at relatively low temperatures, as at 65–80° F., solid paraffin waxes can develop a rancid odor in prolonged storage. In addition, paraffin waxes when undergoing oxidation darken considerably in color.

Inasmuch as petroleum waxes are used in the compounding of pharmaceutical specialties, such as ointments, it is necessary that they be free of disagreeable odors. Still other uses for paraffin waxes requiring substantially odor-free materials include: food coatings, paper and cardboard food containers, milk containers, grease-proof paper, frozen-food wraps, fruit-wrap papers and the like. It is apparent, then, that if paraffin waxes are to be suitable for such uses it is necessary to shield them from oxygen or it is necessary to make them resistant to oxidation. Obviously, it is difficult—if not economically impractical—to shield paraffin waxes from the atmosphere when using or storing the same.

Methods hitherto proposed for making paraffin waxes resistant to oxidation have generally proven inefficient or excessively expensive. For example, two such methods which have not been entirely successful are: (1) treatment with steam to drive off volatile organic acids, and, (2) filtration through clay to remove acids by adsorption.

This problem has also been approached through the additive route. Several additives have been used with more or less success to counteract the oxidation of paraffin waxes. However, such additives as have been used generally are effective in stabilizing wax against either color deterioration or the development of a rancid odor, but these additives generally do not stabilize the wax against both of these deleterious effects. Propyl gallate is an example of one material used for this purpose. Another is a tertiary butylated hydroxyanisole, which has been sold under the commercial name of "Sustane."

Waxes have also been treated to improve their color. One such approach to this problem has been to incorporate substantial amounts of stearic acid with the wax. For example, 15% by weight of stearic acid has been used commercially with paraffin wax. Initially, stearic acid has a whitening effect on the wax. However stearic acid darkens when exposed to light. Stearic acid is generally applied as an outer coating to such materials as candles, to stiffen the latter as well as impart the initial whitening effect. It will be appreciated that light stability of candles is an important feature, because samples of candles oftentimes are displayed in show windows.

It has now been discovered that the aforesaid deleterious effects of oxidation can be counteracted by a combination of additives which together behave synergistically. One of the additives is generally regarded as the antioxidant and the second of the additives is generally designated as the synergist. Here, it has been found that lauryl gallate and related materials behave as the antioxidant. In combination therewith is the synergist, stearyl citrate and related materials. Each of these materials is used in relatively small concentrations.

It is a primary object of this invention to protect wax against the deleterious effects of oxidation, in particular to protect such materials against color and odor deterioration. Another object is to provide a wax resistant to oxidation when stored at elevated temperatures. Still another object is the provision of a wax resistant to oxidation when exposed to light for relatively long periods of time. It is another object of this invention to further improve wax and stearic acid blends.

Another important object of this invention is to provide a new wax composition of matter comprising a synergistic combination of materials. Other objects of this invention will be apparent from the following description of the invention.

As indicated above, the antioxidant contemplated here is an alkyl ester of gallic acid wherein the esterifying group is a hydrocarbon solubilizing group. Particularly effective of such esters is lauryl gallate.

In sharp contrast, to the unusually superior results obtained with lauryl gallate and the aforesaid related materials in combination with the synergists of this invention, it has been found that propyl gallate, for example, is relatively ineffective or in some instances even deleterious. One other factor militating against the use of propyl gallate is its relatively low solubility in petroleum waxes. In this connection, gallic acid itself is entirely insoluble in wax. In general, the esterifying group for gallic acid contains at least about eight carbon atoms.

The synergist contemplated herein comprises an alkyl ester of citric acid wherein the esterifying group or groups is a hydrocarbon solubilizing group. Outstanding of such esters is tristearyl citrate. Generally, the esterifying group for citric acid contains at least about twelve carbon atoms. It will be understood that from one to three of such groups can be present in the ester, and that mixtures of such mono-, di- and tri-esters can be used.

In sharp contrast, it has been found that isopropyl citrate is not only ineffective, when used in combination with lauryl gallate, but is actually deleterious to the wax in which it is incorporated. Similar results have been obtained with citric acid, and tartaric acid.

The antioxidant and synergist, described above, can be incorporated simply in a hydrocarbon product such as a petroleum wax. The additives are added to wax and stirred into the same, in which they are readily dispersed. It has been found that temperature has some effect on the ease with which the additives become readily dispersed in the wax. In general, it is recommended that the wax be heated to a temperature of about 160° to 180° F., whereupon the additives are added and stirred or mixed into the hot wax. The concentration of the antioxidant and of the synergist are so small that little difficulty is encountered is dispersing or mixing the same in the wax. The antioxidant is generally used in concentrations from about 0.00005 to about 0.1% of the wax, preferably from about 0.0001 to about 0.005%. Correspondingly, the synergist is usually present in amounts ranging from 0.00005 to about 0.1% by weight, with preference to amounts ranging from 0.0001 to about 0.005%.

The beneficial effect of the additives contemplated herein is shown by a heat stability test, which simulates actual condition. The additives were added to a 125–127° F. melting point, refined paraffin wax, in the manner indicated above. The resulting blends were stored in contact with iron at 200° F. The blends were sampled periodically for color and odor tests. The odor tests were conducted in the following manner. A small quantity of the wax sample was shaved into a clean, odorless container. The container was sealed and allowed to so stand for at least one hour before it was reopened and the wax sample smelled. One sample was prepared as indicated for each observer because repeated opening of the container allows the odor to be dispersed. The odor of the wax is rated in the following manner: 1 no odor; 1.5 very slight odor; 2 mild odor; 3 moderate odor; 4 strong odor. An arithmetical average of ratings of the observers is taken as the final result. The results of such odor tests, together with color stability tests, are set forth in Table I below. Saybolt color was determined by the method of ASTM designation D–153–53T (see ASTM Standards on Petroleum Products and Lubricants, November 1954 edition, page 93).

TABLE I

| Antioxidant | Percent by Weight | Days of +30 Saybolt Color | Days of Good Odor |
|---|---|---|---|
| None | | 3 | 2 |
| Lauryl Gallate | 0.004 | 14 | 34 |
| Stearyl Citrate | 0.01 | 3 | <1 |
| Lauryl Gallate | 0.004 | >40 | >40 |
| Stearyl Citrate | 0.01 | | |

From inspection of the results set out in Table I, it will be seen that the blank wax, that is one containing no additive, developed a darker color than +30 Saybolt after three days of the heat stability test and that the odor exceeded 1.5 after two days. When a small amount of lauryl gallate only is added to the wax, the color stability goes up to fourteen days, and the odor stability goes up to thirty-four days. When stearyl citrate alone is used as the additive there is no improvement in color and there is a worsening of odor. However, when lauryl gallate and stearyl citrate are used in combination, the color stability increases surprisingly as does the odor stability; the color and odor were still satisfactory after 40 days of test when the test was concluded.

Tristearyl citrate was used in the tests shown in Table I and in the tests shown hereinbelow.

Heat stability of wax and wax containing various additives is shown in the figure attached hereto containing a bar graph. In this instance the wax and wax blends were stored in an oven at 200° F., and were periodically sampled for color and odor rating. Referring to the bar graph, it will be seen that the blank wax has a stability of only two days. When a small amount of Sustane (tertiary butylated hydroxy anisole) is added to the wax, the stability improves to four days. Opposed to this is the showing of lauryl gallate alone; wax containing lauryl gallate has a stability of fourteen days. However, when lauryl gallate and stearyl citrate are used together with the wax, the stability improves to thirty-five days. This is entirely unexpected since stearyl citrate used alone in the wax will provide a stability of less than one day, and lauryl gallate alone will provide a stability of only fourteen days. Thus, the combination of lauryl gallate and stearyl citrate, on a theoretical basis, would be only about fourteen to fifteen days instead of the thirty-five days actually found by experimentation. The results set out in the bar graph also reveal that stearyl citrate worsens the wax when it is used in combination with propyl gallate. That is, when propyl gallate is used alone it provides a much more stable wax than does the combination of propyl gallate and stearyl citrate. Still other unusual results are shown by the bar graph. For example, the combination of lauryl gallate and isopropyl citrate is actually worse than the blank wax.

Oftentimes in commercial operations, wax is stored over water rather than in a dry tank. It has been found that wax stored over water is less stable than wax stored in a dry tank. Wax samples and wax containing additives were made up and were prepared in the following manner. One sample was added to a beaker wherein iron nails were present. Another sample was added to a beaker, 100 grams of wax sample being so added, together with 100 grams of water. Iron nails were then added to the latter. These beakers were then stored at 180° F. Results of such tests are set out below in Table II.

TABLE II

*Analysis of the variables effecting the heat of paraffin wax-antioxidant blends, dry and floating over water, when stored at 180° F. in contact with iron*

| Variables | Average Days Of Good Color | Saybolt Color | |
|---|---|---|---|
| | | Before | After |
| Effect of the Addition of Stearyl Citrate to Wax: | | | |
| Wax Alone | 3 | +30 | +30 |
| Wax with Stearyl Citrate (0.0002%) | 6 | +30 | +30 |
| Effect of Stearyl Citrate Concentration With Lauryl Gallate (0.0002%): | | | |
| 0.0025% | 33 | +30 | +26 |
| 0.0002% | 28 | +30 | +27 |

It will be noted in connection with the results provided in Table II above, that stearyl citrate added alone to wax improves the stability of the wax. However, by combining stearyl citrate with lauryl gallate in the wax, a surprising improvement is realized.

Additional heat stability tests are provided in Table III below. These tests were obtained by subjecting wax and wax-additive blends at 200° F. in contact with iron for various periods of time.

TABLE III

*Effect of antioxidants upon the heat stability of 125–127° F. (A. M. P.) paraffin wax when stored at a temperature of 200° F. in contact with iron*

| Antioxidant | Percent By Weight | Synergist | Percent By Weight | Days of +30 Saybolt Color | Odor Before | Odor After | Days of 1.5 Odor | Saybolt Color Before | Saybolt Color After |
|---|---|---|---|---|---|---|---|---|---|
| Lauryl Gallate | 0.004 | | | 3 | 1.5 | 4.0 | 2 | +30 | +30 |
| Do | 0.004 | | | 14 | 1.5 | 1.5 | 34 | +30 | +26 |
| Do | 0.004 | Stearyl Citrate | 0.01 | 40 | 1.5 | 1.5 | 46 | +30 | +25 |
| Do | 0.004 | Isopropyl Citrate | 0.01 | 1 | 1.5 | 1.5 | 18 | +30 | +9 |
| Do | 0.004 | Citric Acid | 0.0025 | 15 | 1.5 | 1.5 | 34 | +30 | +25 |
| Do | 0.004 | Tartaric Acid | 0.005 | 1 | 1.5 | 1.5 | 21 | +30 | +10 |
| Do | 0.004 | Sulfonic Acid | 0.02 | <1 | 1.5 | 1.5 | 18 | +30 | +20 |
| Propyl Gallate | 0.004 | | | 25 | 1.5 | 1.5 | 43 | +30 | +27 |
| Do | 0.004 | Stearyl Citrate | 0.01 | 13 | 1.5 | 1.5 | 50 | +30 | +25 |
| Do | 0.004 | Isopropyl Citrate | 0.01 | 8 | 1.5 | 1.5 | >60 | +30 | +28 |
| Do | 0.004 | Citric Acid | 0.0025 | 27 | 1.5 | 1.5 | 35 | +30 | +27 |
| Do | 0.004 | Tartaric Acid | 0.005 | 1 | 1.5 | 1.5 | 25 | +30 | +18 |
| Do | 0.004 | Sulfonic Acid | 0.02 | <1 | 1.5 | 1.5 | 21 | +30 | −2 |

Inspection of the results set out in Table III reveals that lauryl gallate alone provides a large measure of improvement to the wax. As indicated in the results in Table I, shown earlier stearyl citrate alone would not improve the wax. When the two additives are used together, however, there is an unexpectedly large improvement. The usual behavior of the various additive materials involved herein is highlighted by the combination of isopropyl citrate with lauryl gallate. In the latter instance, it will be seen that there is actually a worsening of the wax rather than an improvement. In the same vein, the combination of propyl gallate and stearyl citrate is worse than propyl gallate alone. Unexpectedly, the combination of propyl gallate and citric acid is somewhat better than propyl gallate used alone.

Further heat stability tests are shown in Table IV which follows below. Here the heat stability of dry paraffin wax and paraffin wax floating over water is determined at 180° F. in contact with iron. These tests were conducted in the same manner as those shown above in connection with Table II.

stored over water. In this connection, it will be noted that the stability of dry wax is ten days as opposed to five for the wet wax, when the standpoint of color is observed. The odor stability of the dry wax is five days opposed to one day for the wet wax. Some measure of improvement is realized with lauryl gallate alone, when used in a concentration of 0.0002%. Correspondingly, a small amount of improvement is realized with stearyl citrate alone. However, when lauryl gallate and stearyl citrate are used together, a large degree of improvement is realized. This is particularly pronounced in the case of a dry wax. Less advantageous results are obtained with a combination of additives, when the wax sample is stored over water.

Additional stability tests are shown in Table V below. In this instance a blank wax or a wax containing one or more of the additives shown herein, were subjected to the test. Each sample or blend was divided into two portions. One was stored at 180° F., in contact with iron. The second half of each sample was then poured into a four-ounce bottle, with iron nails present in each

TABLE IV

*Effect of antioxidant concentration upon the heat stability of dry paraffin wax and paraffin wax floating over water at 180° F. in contact with iron*

| Antioxidant | Percent By Weight | Synergist | Percent By Weight | Dry Wax | Wax Over Water | Days of +30 Saybolt Color | Odor Before | Odor After | Days of 1.5 Odor | Saybolt Color Before | Saybolt Color After |
|---|---|---|---|---|---|---|---|---|---|---|---|
| | | | | Yes | | 10 | 1.5 | 4.0 | 5 | +30 | +30 |
| | | | | | Yes | 5 | 1.5 | 4.0 | 1 | +30 | +30 |
| Lauryl Gallate | 0.0002 | | | Yes | | 16 | 1.5 | 1.5 | 28 | +30 | +26 |
| Do | 0.0002 | | | | Yes | 5 | 1.5 | 1.5 | 6 | +30 | +28 |
| | | Stearyl Citrate | 0.0002 | Yes | | 10 | 1.5 | 4.0 | 7 | +30 | +30 |
| | | do | 0.0002 | | Yes | 10 | 1.5 | 4.0 | 7 | +30 | +30 |
| | | do | 0.0025 | Yes | | 10 | 1.5 | 4.0 | 7 | +30 | +30 |
| | | do | 0.0025 | | Yes | 5 | 1.5 | 4.0 | 3 | +30 | +30 |
| Do | 0.0002 | do | 0.0002 | Yes | | 42 | 1.5 | 1.5 | 42 | +30 | +30 |
| Do | 0.0002 | do | 0.0002 | | Yes | 5 | 1.5 | 1.5 | 11 | +30 | +27 |
| Do | 0.0002 | do | 0.0025 | Yes | | 42 | 1.5 | 1.5 | 42 | +30 | +30 |
| Do | 0.0002 | do | 0.0025 | | Yes | 10 | 1.5 | 4.0 | 7 | +30 | +30 |
| Do | 0.0025 | do | 0.0002 | Yes | | 44 | 1.5 | 1.5 | 44 | +30 | +30 |
| Do | 0.0025 | do | 0.0002 | | Yes | 1 | 1.5 | 1.4 | 16 | +30 | +30 |
| Do | 0.0025 | do | 0.0025 | Yes | | 44 | 1.5 | 1.5 | 44 | +30 | +30 |
| Do | 0.0025 | do | 0.0025 | | Yes | 1 | 1.5 | 1.5 | 14 | +30 | +20 |

Inspection of results set out in Table IV reveals that, in keeping with earlier findings, wax is more stable when stored in the dry condition, rather than when bottle. The filled bottles were then stored in the Fade-O-Meter. Samples were periodically taken from the two tests for color and odor ratings.

TABLE V

| Lauryl Gallate (Percent By Weight) | Stearyl Citrate (Percent By Weight) | Storage at 180° F. In Contact With Iron | | | Saybolt Color | | Fade-O-Meter, 96 Hours' Exposure Saybolt Color | |
|---|---|---|---|---|---|---|---|---|
| | | Dry Wax | Wax Over Water | Days of 1.5 Odor | Before | After | Before | After |
| -------- | -------- | Yes | ---- | 5 | +30 | +30 | +30 | +17 |
| -------- | -------- | ---- | Yes | 1 | +30 | +30 | ----- | ----- |
| 0.0002 | -------- | Yes | ---- | 16 | +30 | +26 | +30 | +26 |
| 0.0002 | -------- | ---- | Yes | 5 | +30 | +28 | ----- | ----- |
| -------- | 0.0002 | Yes | ---- | 7 | +30 | +30 | +30 | +30 |
| -------- | 0.0002 | ---- | Yes | 7 | +30 | +30 | ----- | ----- |
| 0.0002 | 0.0002 | Yes | ---- | 42 | +30 | +30 | +30 | +30 |
| 0.0002 | 0.0002 | ---- | Yes | 11 | +30 | +27 | ----- | ----- |

Again the results demonstrate that a combination of lauryl gallate and stearyl citrate behaves synergistically, as opposed to either additive being used alone.

As indicated earlier, wax used for candles and the like generally contain an outer coating comprising a blend of wax and stearic acid. The stearic acid is generally used for whitening and stiffening the candle. The effect of lauryl gallate and stearyl citrate on wax-stearic acid blends is demonstrated below by the results set out in Table VI.

TABLE VI

*Effect of antioxidants on wax-stearic acid blends, 15% stearic acid*

| Lauryl Gallate, Percent By Wt. | Stearyl Citrate, Percent By Wt. | Fade-O-Meter, 96 Hrs., Exposure Saybolt Color | |
|---|---|---|---|
| | | Before | After |
| -------- | -------- | +22 | +14 |
| 0.0002 | -------- | +21 | +13 |
| -------- | 0.0002 | +30 | +20 |
| 0.0002 | 0.0002 | +26 | +19 |

Additional tests on paraffin wax-stearic acid blends, together with paraffin wax, are shown in Table VII given below.

TABLE VII

*The effect of antioxidant concentration upon the light stability of paraffin wax and paraffin wax-stearic acid (15%) blends stored in the Fade-O-Meter for 96 hours*

| Lauryl Gallate, Percent By Weight | Stearyl Citrate, Percent By Weight | Wax Alone | Wax+ Stearic Acid | Hours +30 Saybolt Color | 96 Hours' Exposure Saybolt Color | |
|---|---|---|---|---|---|---|
| | | | | | Before | After |
| ------ | ------ | Yes | -------- | 2 | +30 | +17 |
| ------ | ------ | -------- | Yes | 0 | +22 | +14 |
| 0.0002 | 0.0002 | Yes | -------- | 96 | +30 | +30 |
| 0.0002 | 0.0002 | -------- | Yes | 0 | +26 | +19 |
| 0.0002 | 0.0025 | Yes | -------- | 24 | +30 | +28 |
| 0.0002 | 0.0025 | -------- | Yes | 0 | +28 | +30 |
| 0.0025 | 0.0002 | Yes | -------- | 8 | +30 | +23 |
| 0.0025 | 0.0002 | -------- | Yes | 0 | +20 | +17 |
| 0.0025 | 0.0025 | Yes | -------- | 2 | +30 | +19 |
| 0.0025 | 0.0025 | -------- | Yes | 0 | +19 | +15 |

Prior to this development, antioxidants which protected wax against elevated temperatures, did not protect wax against light. Also materials which gave protection against light, did not give protection against heat. The combinations of materials contemplated herein, and particularly the combinations of lauryl gallate and stearyl citrate, provides protection against both heat and light.

Although the data set out above is primarily directed to the stabilization of petroleum waxes, it is broadly contemplated that the synergistic combination shown herein will be effective also for the stabilization of all materials susceptible to oxidation. That is, the invention contemplated herein is directed to the stabilization of fatty oils, marine oils, vegetable oils and the like. In the field of hydrocarbons, the invention is pointed to the stabilization of fully refined or semi-refined waxes derived from petroleum, Ozokerite and shale oils of all types. Stabilization of solid hydrocarbons of the aliphatic series ranging from 20 carbon atoms to about 35 carbon atoms is a primary object of this invention.

I claim:

1. Paraffin wax containing from about 0.00005 to about 0.1 percent by weight of lauryl gallate and from about 0.00005 to about 0.1 percent by weight of stearyl citrate.

2. Paraffin wax containing from about 5 to about 40 percent by weight of stearic acid, from about 0.00005 to about 0.1 percent by weight of lauryl gallate, and from about 0.00005 to about 0.1 percent by weight of stearyl citrate.

3. Hydrocarbon wax containing from about 0.00005 to about 0.1 percent by weight of each of the following: (a) an alkyl ester of gallic acid wherein the esterifying group is a straight chain saturated hydrocarbon solubilizing group containing at least about eight carbon atoms, and (b) an alkyl ester of citric acid containing at least one straight chain saturated hydrocarbon solubilizing group of not less than about twelve carbon atoms.

4. Hydrocarbon wax containing from about 0.00005 to about 0.1 percent by weight of each of the following: (a) lauryl gallate, and (b) tristearyl citrate.

References Cited in the file of this patent

UNITED STATES PATENTS

| | | |
|---|---|---|
| 2,116,220 | Shoemaker | May 3, 1938 |
| 2,511,804 | Hall et al. | June 13, 1950 |
| 2,518,678 | Gooding et al. | Aug. 15, 1950 |
| 2,623,897 | Van der Kerk | Dec. 30, 1952 |
| 2,677,616 | Hall | May 4, 1954 |
| 2,768,084 | Griffith et al. | Oct. 23, 1956 |
| 2,772,170 | Hall | Nov. 27, 1956 |

UNITED STATES PATENT OFFICE
CERTIFICATE OF CORRECTION

Patent No. 2,860,064                                              November 11, 1958

Charles F. Duchacek

It is hereby certified that error appears in the printed specification of the above numbered patent requiring correction and that the said Letters Patent should read as corrected below.

Column 5, line 29, for "usual" read -- unusual --.

Signed and sealed this 17th day of February 1959.

(SEAL)
Attest:
KARL H. AXLINE

Attesting Officer

ROBERT C. WATSON
Commissioner of Patents